Jan. 28, 1947.  H. G. HUGHEY  2,414,878
OXYGEN VALVE FOR CUTTING TORCHES
Filed Aug. 19, 1944
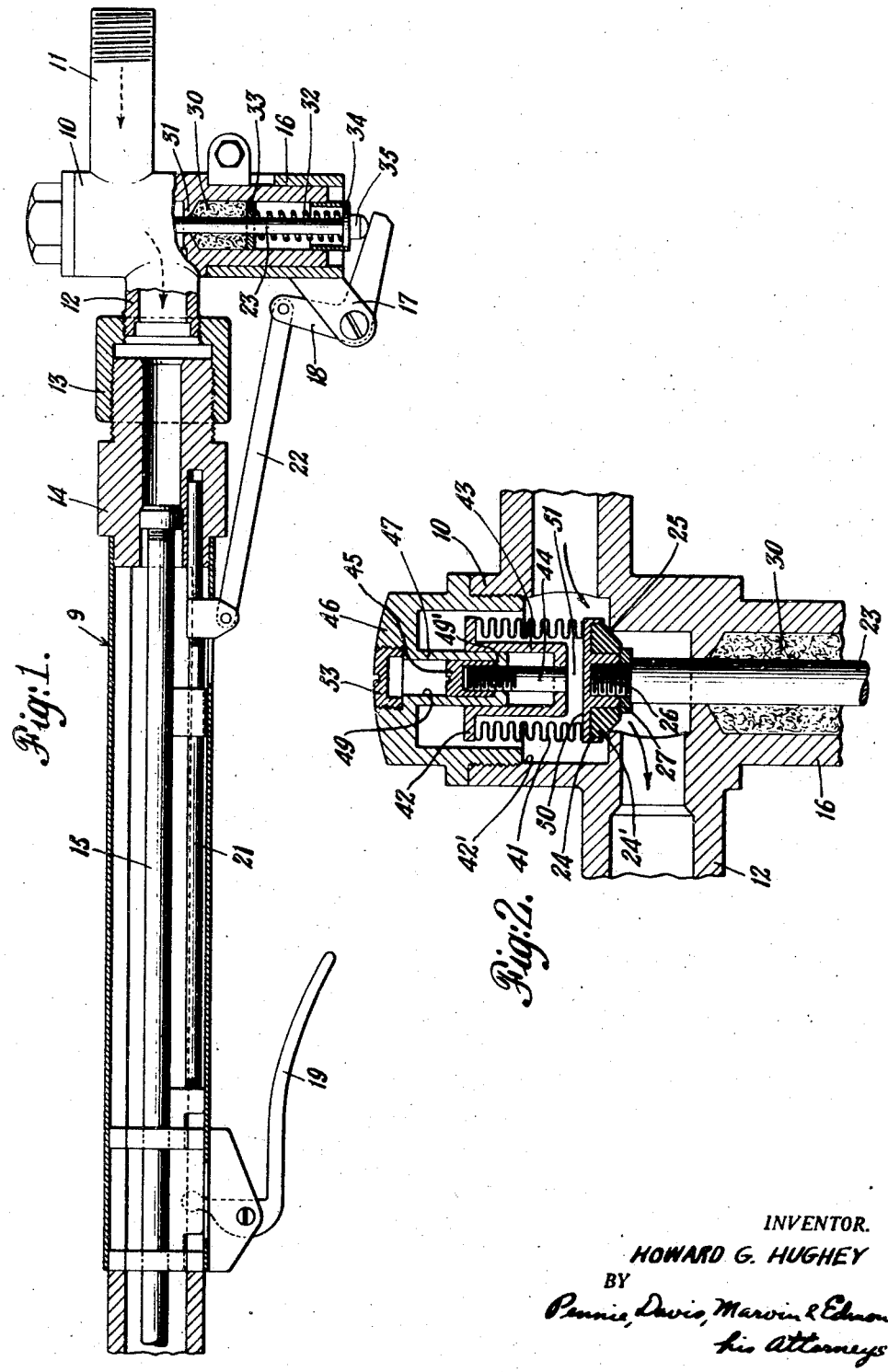
INVENTOR.
HOWARD G. HUGHEY
BY
Pennie, Davis, Marvin & Edmonds
his Attorneys Patented Jan. 28, 1947

2,414,878

UNITED STATES PATENT OFFICE 2,414,878

OXYGEN VALVE FOR CUTTING TORCHES

Howard G. Hughey, Fanwood, N. J., assignor to Air Reduction Company, Incorporated, New York, N. Y., a corporation of New York Application August 19, 1944, Serial No. 550,175

4 Claims. (Cl. 251—31)

This invention relates to manually-operated valves of the plunger type which are subjected to high pressures and more particularly to such valves as are used for controlling the cutting oxygen supply of a cutting torch.

In cutting torches, it is desirable that the valve controlling the high pressure cutting oxygen be gradually and easily opened so that the cutting oxygen stream will be accurately controlled. These valves are of the quick-acting plunger type so that the valve can be quickly opened or closed. In the closed position, the high pressure oxygen acts to hold the valve element tight upon its seat and this force has to be initially overcome upon opening the valve. As the valve element is severed from its seat and the seal breaks, this force no longer acts on the valve, and consequently the valve snaps open before the operator can react to the decrease in opposing force to reduce the force he had applied to initially break the seal. This effect is increasingly noticeable if the force of the fluid acting on the valve element is such as to exceed the spring force which normally holds the valve element closed.

It is an object of the present invention to provide an oxygen valve for cutting torches wherein only a small force is required to open the valve and wherein the force required is constant throughout the full extent of the opening movement.

According to the present invention, the valve element in its closed position is rendered uninfluenced by the fluid pressure on the inlet side of the valve. Axially spaced from the valve element is an axially movable part which takes up the fluid pressure. This movable part is connected to the valve element by a bellows to further prohibit contact of fluid with the top face of the valve element. The movable part is limited in its downward movement by a stop arrangement and never actually contacts the valve element while the valve element is in the closed position. The valve element can be easily unseated without excess manual force being applied since fluid pressure does not reach its top face and the only manual force necessary to unseat the valve element is that required to overcome the spring which continuously urges the valve to its closed position. As the valve element is manually unseated, engagement is made with a depending portion of the axially movable part, and the valve element, the bellows and the axially movable part are moved as a unit as the valve is moved further to its wide open position.

For a better understanding of the invention, reference may be had to the following detailed description taken in connection with the accompanying drawing, in which:

Fig. 1 is a cross-sectional view of a portion of a cutting torch with a valve having the features of the present invention;

Fig. 2 is an enlarged cross-section taken through the valve and showing the inner parts of the valve when the valve element is seated.

Referring now particularly to Fig. 1, there is shown a cutting torch 9 with a valve casing 10 having an inlet 11 and an outlet 12 to which is coupled metal parts 13, 14, through which cutting oxygen is delivered to internal tube 15 for delivery to a nozzle tip, not shown, at the forward end of the torch. Other means, not shown, is provided for receiving a preheating gas mixture and delivering the same to the nozzle tip. The valve 10 has a sleeve 16 thereon which pivotally supports through bracket 17, a bell crank 18, which is adapted when pivoted by hand lever 19 acting through shaft 21 and link 22 connected with the crank to raise valve stem 23 and plunger valve element 24, Fig. 2. As the valve stem is depressed upwardly into the valve casing 10, flow of oxygen is established from the inlet 11 through valve casing 10 to outlet 12 and coupling members 13, 14.

The valve element 24 carries a rubber or synthetic valve facing 24' that bears on a valve seat portion 25, Fig. 2, of the valve casing 10 to prevent the flow of cutting oxygen gas or fluid through the valve. The valve stem 23 has a reduced threaded end 26 connecting the stem with the valve element 24. Surrounding this threaded portion 26 is a collar 27 which helps to retain the synthetic valve facing 24' in position by engaging its bottom face thereof.

The valve stem 23 is surrounded by a packing 30, bearing against a partition 31 through which stem 23 slides, to prevent gas leakage therealong. A spring 32 surrounding the valve stem 23 acts between packing-retaining plate 33 and a cup-shaped spring-retaining member 34 and round nut 35 on the lower end of the stem to normally maintain valve element 24 on its seat 25. The bell crank 18 engages round nut 35 in actuating the stem 23. To the valve element 24 is fluid tightly connected or brazed a bellows or fluid tight expansible connection 41 which in turn is fluid tightly connected or brazed at its other end to an axially movable part 42, so that the valve element 24, bellows 41 and part 42 form a unit. This unit is readily assembled upon the valve stem by screwing the valve element 24 to the threaded portion 26 of the valve stem and inserting the assembly into the valve casing 10 through its large opening 42.

The axially movable part 42 has a central depending sleeve-like portion 43 lying within the bellows 41. Centrally within this sleeve portion 43 is secured an upstanding threaded stub 44 on the upper end of which is threadedly connected a limiting stop nut 45. This stop nut 45 is applied to the stub 44 after a main closure cap 46 is threaded into the large opening 42', so that its depending sleeve-like portion 47 is extended into and slidably coupled to depending portion 43 of the axially movable part 42 and with the stub 44 being projected into opening 49 provided by the latter depending portion 47. As the stop nut 45 abuts the bottom 49' of chamber 49 of the main cap 46, movement of the axially movable part 42 toward the valve 24 is arrested. This movement of the part 42 will be effected as the fluid pressure enters the valve casing from the inlet 11. Fluid pressure thus acts upon or is taken up by the axially movable part 42 instead of upon top face 50 of the valve 24. The fluid force is not eliminated, but its point of application is transferred to and absorbed by the axially movable part 42. The fluid pressure is thus kept off the top face of the valve. The pressure is only directed against the axially movable part 42 while the valve element is on its seat.

As the operator raises valve element 24 from its seat, the gas pressure on the facing of the valve element 24 and on the movable part 42 becomes equalized, upon the gap 51 between bottom 49' and valve element 24 being taken up. Thereafter, these three parts are moved together as a unit to the fully open position of the valve. A small cap 52 is threaded into the main cap 46 to close the opening 49 therein after the proper adjustment of the stop nut 45 has been made on the stub 44.

I claim:

1. In a fluid valve, a valve casing having an inlet and an outlet, a valve seat between the inlet and the outlet, a valve element cooperating with the valve seat and arranged to close in the direction of fluid flow by the seat to stop flow of fluid through the valve, biasing means for retaining the valve element upon the seat, means for separating the valve element from its seat against the action of the biasing means to establish fluid flow through the valve, means for rendering the valve element independent of and uninfluenced by the fluid pressure of the inlet, said rendering means including a fluid pressure absorbing part axially movable with and with respect to the valve element, and a fluid tight expansible connection between the pressure absorbing movable part and the valve element, means for limiting the movement of the axially movable part toward the valve element so as to be held out of engagement with the valve element when the valve element is seated and to absorb the force resulting from fluid pressure which would otherwise act directly upon the valve element.

2. In a quick-acting plunger type valve, a valve casing having a seat therein, an inlet and an outlet located respectively at the opposite sides of the seat, a valve element arranged to close in the direction of fluid flow by the seat and normally biased to a closed position, manual means for moving the valve element to an open position to establish fluid flow through the valve, means for preventing fluid pressure in the inlet from tending to maintain the valve element in its closed position including a bellows secured to the valve element over its top face, an axially movable part secured to the bellows, means for maintaining the axially movable part out of engagement with the valve element when the latter is in its closed position, said movable part, bellows and valve element moving as a unit when the initial opening movement of the valve element has been effected and the fluid pressure upon the valve element and the axially movable part has been equalized.

3. In a valve, a valve casing having a large opening and a valve seat coaxial with the opening, a valve element arranged to close in the direction of fluid flow by the seat, a bellows, and an axially movable part formed into a unit and insertable into the valve casing through the large opening, a cap connected to the casing for closing the large opening, means for maintaining the axially movable part against the action of fluid pressure upon it out of engagement with the valve element when the valve element is closed on its seat, said axially movable part and the bellows serving to prevent exposure of the valve element to inlet fluid pressure when the valve element is in its closed position, said maintaining means comprising relatively slidable sleeve-like portions, one of which being provided on the closing cap and the other of which being provided upon the axially movable part, and stop means for arresting the downward movement of the axially movable part toward the valve element to leave a gap therebetween when the valve element is in its closed position.

4. In a valve, a valve casing having a large opening and a valve seat coaxial with the opening, a valve element cooperating with the seat and arranged to close in the direction of fluid flow by the seat and normally preventing fluid flow through the valve casing, an axially movable part above the valve element, a fluid-tight expansible connection between the valve element and the axially movable part, said axially movable part having a central depending sleeve-like portion adapted to lie within the fluid-tight expansible connection and a threaded stub extending upwardly within this latter portion, a closure cap for the large opening having a sleeve-like portion adapted to fit within the sleeve-like portion of the axially movable part and receive through its bottom the threaded stub thereof, an adjusting stop on the threaded stub and adapted to slide within the sleeve-like portion of the closure cap for engagement with the bottom thereof to limit the downward movement of the axially movable part and maintain it out of engagement with the valve element while the latter is on the seat portion whereby the valve element normally rests upon the seat uninfluenced by fluid pressure, the arrangement of the parts being such that after the valve element has been raised from its seat and the fluid pressure equalized upon the movable part and the bottom face of the valve element, the valve element will engage the depending portion of the axially movable part and these parts including the expansible connection is raised as a unit.

HOWARD G. HUGHEY.